H. F. MAXIM.
CONNECTOR FOR ELECTRIC CONDUCTORS.
APPLICATION FILED JAN. 15, 1913.

1,168,529. Patented Jan. 18, 1916.

UNITED STATES PATENT OFFICE.

HOSEA F. MAXIM, OF NORFOLK, VIRGINIA, ASSIGNOR OF ONE-HALF TO OTTO WELLS, OF NORFOLK, VIRGINIA.

CONNECTOR FOR ELECTRIC CONDUCTORS.

1,168,529.   Specification of Letters Patent.   Patented Jan. 18, 1916.

Application filed January 15, 1913. Serial No. 742,250.

*To all whom it may concern:*

Be it known that I, HOSEA F. MAXIM, a citizen of the United States, residing at Norfolk, in the county of Norfolk and State of Virginia, have invented certain new and useful Improvements in Connectors for Electric Conductors, of which the following is a specification, reference being had therein to the accompanying drawing.

This invention relates to improvements in spring connectors for electrical conductors and in particular to that type commonly furnished with dry cells and by means of which connecting wires may be quickly and easily connected to or disconnected from the carbon and zinc terminals of the cells. The clip is also adapted to be placed on any piece of electrical apparatus where it is desirable to attach a wire to an electrical conductor.

Figure 1:
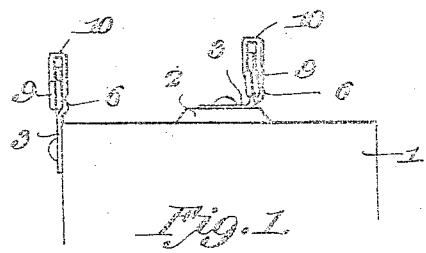
Figure 2:
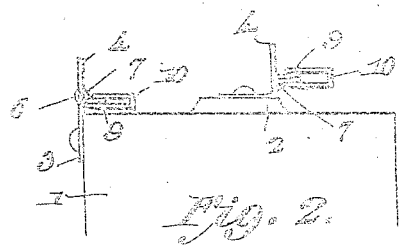
Figure 3:
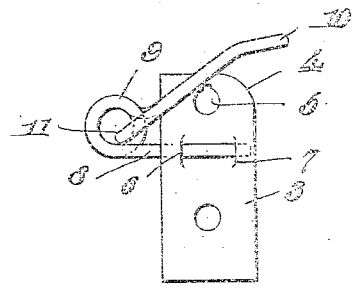
Figure 4:
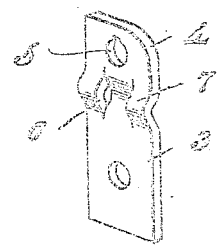
Figure 5:
Figure 6:
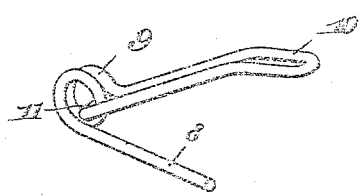
Figure 9:
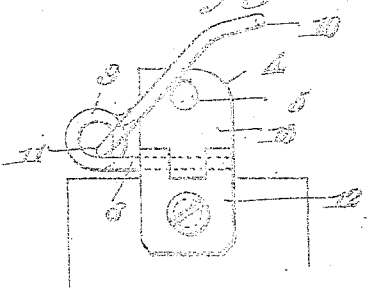
Figures 7, 8:
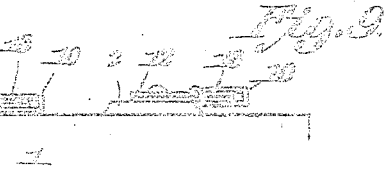

Referring to the drawings, Figure 1 is a fragmentary side elevation of a dry cell showing two of my improved battery clips attached, one to the carbon and one to the zinc terminal, and in their normal operating position. Fig. 2 is a view similar to Fig. 1 showing the conductor engaging springs of my improved terminal folded horizontal to facilitate packing of the cell for shipment. Fig. 3 is a side elevation of my improved conductor detached. Fig. 4 is a perspective view of the conductor plate. Fig. 5 is an end elevation of a plate similar to that shown in Fig. 4 but of slightly modified form. Fig. 6 is a perspective view of the spring removed from the plate. Fig. 7 is a fragmentary elevation of a dry cell showing two of my spring clips of modified form, one attached to the zinc and the other to the carbon terminals. Fig. 8 is a view similar to Fig. 6 showing the modified form of clips folded parallel to the top of the cell. Fig. 9 is a side elevation of one of my clips attached to a carbon post.

In the drawings the numeral 1 indicates a dry cell of the well-known type having a case or shell of sheet zinc forming a negative terminal of the inclosed cell. In the type of cell illustrated in Figs. 1, 2, 7 and 8 the carbon of the cell is not shown, it being capped by a flat disk of conducting metal 2 positioned in the center of the cell and serving as the positive terminal. The form of clip illustrated in Figs. 1 to 6 inclusive comprises a body in the form of a flat strip 3 of brass or other conducting material of substantially rectangular form, one corner, however, being beveled off at 4 for the purpose hereinafter described. A hole 5 is drilled through the strip at the end adjacent the beveled off corner 4. Two slits 6 and 7 are cut in the body of the clip below the opening 5 approximately one-third of the distance in from each side and parallel to the longer sides of the rectangle. The metal at each side of the two slits is formed outward at each side of the vertical plane containing the strip as in Fig. 4, or entirely at one side of the plane as illustrated in Fig. 5. The body part described can be considered as having two parts, (in this case formed integrally), the lower part being adapted for attachment to the battery and the upper part being adapted for the engagement of the conductor wire.

The conductor engaging spring is shaped as illustrated in Fig. 6 having one end 8 extending tangential from the double coils 9. The other end extends radially from the coil at approximately 45° to the end 8 and is bent back upon itself to form a finger 10, the end 11 extending within the coils 9.

In assembling the clips the straight end 8 of the conductor engaging spring is inserted within the bearing formed in the plate 3 by the metal being formed away from the cuts 6 and 7 as illustrated in Fig. 3. The coil is positioned at the sides of the rectangular plate opposite to the beveled corner 4 so that the finger piece 10 formed of the double wire extends upon each side of the strip 3 up above the opening 5. When pressure is exerted on the outer end of the finger piece 10, the coil spring is compressed and the finger is permitted to pass downward along each side of the strip to points below the opening 5. A wire conductor may then be inserted within the opening 5, and then on releasing the finger, its spring action forces it upward pressing the wire into contact with the upper edge of the opening. The corner 4 is beveled away from the upper corner of the plate 3 so as to prevent injury to the operator's finger when the spring finger 10 is pressed downward. If this were not beveled away, the sharp corner would come in contact with the operator's finger. The lower portion of the plate 3 is bent at right angles as illustrated in Figs. 1 and 2 when it is desired to position the clip on the carbon terminals. When the clip is to be attached to the zinc terminal as illustrated in Figs. 1 or 2, the plate is not bent but is secured in a vertical position.

One of the disadvantages of the well known types of spring clips is, that in shipping they are liable to disengagement resulting from contact with adjacent batteries or with the top or bottom of the retaining box. I have provided in my clip an improvemnet whereby such injury is obviated and the vertical height of the battery materially decreased when it is prepared for shipment. As before noted, the bearing provided in the vertical body 3 for the reception of the end 8 of the spring clip is formed by punching out either upon both sides or upon one side of the vertical plane of the body a small tongue of metal. In assembling the clip the end 8 of the spring is inserted in the bearing, while the body of the spring is positioned at right angles to the body part. It is then turned upon the end 8 as an axis and the spring finger 10 elevated until one side of the finger passes over the squared corner 11 of the upper end of the body opposite to the beveled corner 4. The resiliency of the coil then causes the finger to be drawn down over the corner 11 securely holding the spring in position. When, however, the cells are to be packed for shipment, the finger is raised up over the corner and swung about the end 8 as an axis until it lies approximately horizontal as illustrated in Fig. 2, thus materially decreasing the over-all height of the cell.

In Figs. 7, 8 and 9 I have illustrated a modified form of my clip in which the two parts or sections of the body of the clip are formed separately and hinge-connected together upon the end 8 of the spring as a pintle. The general arrangement of the spring conductor engaging finger, the conductor opening, etc., are similar to the previously described clips. The body of the clip is divided at approximately its transverse center into the two halves 12 and 13. The adjacent edges of the two halves are provided with alined openings through which the straight end 8 of the spring clip passes providing for it a retaining bearing as in the previously described clips, and, at the same time, providing a pintle upon which the two halves of the body are free to move. In this manner a single clip is provided which may be positioned either with the parts bent at right angles and attached to a battery carbon as illustrated in Figs. 7 and 8, or it may be attached vertical to the outer shell of a cell as shown in the same figures. It is obvious that by means of hinging the two parts this clip is adapted to be fastened to conductors of various shapes and sorts to which the ordinary type of clip could not be attached without modification.

Fig. 8 illustrates a further advantage possessed by this hinge clip in which it is adapted to be turned upon its hinge to a horizontal position when the cell is to be shipped thereby decreasing the height of the cell even more than is possible with the type of clip previously described.

What I claim is:

1. In a connector for electric conductors, the combination of a body, and a vertically vibrating spring coöperating with the body part to engage a conductor, the said spring being pivoted to the lower part of the body on a horizontal axis lying in the plane determined by the vibrations of the spring.

2. In a connector for electric conductors, the combination of a flat body having an opening within which to receive an electric conductor, and a wire spring positioned to vibrate vertically in a plane substantially parallel with the body, the said spring being pivotally connected to the lower part of the body on a horizontal axis lying in the plane of the vibrations of the spring.

3. In a connector for electric conductors, the combination of a flat body and a conductor-engaging spring vibrating vertically in substantially the same plane as the body, one end of the said spring being horizontally pivotally mounted on the lower part of the body on an axis lying in the plane thereof.

4. In a connector for electric conductors, the combination of a flat body, and a conductor-engaging spring positioned to vibrate vertically in substantially the same plane as the body and pivotally connected to the lower part thereof on a horizontal axis lying in the plane thereof.

5. In a connector for electrical conductors, the combination of two flat sections hinge-connected, and a narrow conductor-engaging spring mounted upon one of the said sections to vibrate substantially in the same plane as that determined by the flat section to which it is secured.

6. In a connector for electrical conductors, the combination of two separable sections provided with axially alined openings along adjacent edges, and a conductor-engaging spring, one end of the said spring being inserted within the said openings to form a pintle whereby the two sections are hinged together.

7. In a connector for electrical conductors, the combination of two hinged sections, a conductor-engaging spring mounted upon one of the said sections, one end of the said spring serving as a pintle for the said hinge connection.

In testimony whereof I affix my signature, in presence of two witnesses.

HOSEA F. MAXIM.

Witnesses:
  MOE LEVY,
  J. L. MITCHELL.